(12) United States Patent
Hartrick et al.

(10) Patent No.: US 8,688,817 B2
(45) Date of Patent: Apr. 1, 2014

(54) NETWORK CONNECTION HAND-OFF USING STATE TRANSFORMATIONS

(75) Inventors: Timothy W. Hartrick, Boulder, CO (US); Alexander A. Kazerani, Santa Monica, CA (US); Jayson G. Sakata, Encino, CA (US)

(73) Assignee: EdgeCast Networks, Inc., Santa Monica, CA (US)

( * ) Notice: Subject to any disclaimer, the term of this patent is extended or adjusted under 35 U.S.C. 154(b) by 342 days.

(21) Appl. No.: 13/047,736

(22) Filed: Mar. 14, 2011

(65) Prior Publication Data

US 2012/0239725 A1   Sep. 20, 2012

(51) Int. Cl.
   *G06F 15/173* (2006.01)
   *G06F 15/16* (2006.01)

(52) U.S. Cl.
   USPC ............ 709/223; 709/227; 709/228; 709/229

(58) Field of Classification Search
   USPC ......................................... 709/227, 228, 230
   See application file for complete search history.

(56) References Cited

U.S. PATENT DOCUMENTS

| | | | |
|---|---|---|---|
| 5,774,660 A * | 6/1998 | Brendel et al. ................ 709/201 |
| 5,951,694 A * | 9/1999 | Choquier et al. ............... 714/15 |
| 6,389,462 B1 | 5/2002 | Cohen et al. | |
| 6,529,477 B1 | 3/2003 | Toporek et al. | |
| 6,820,133 B1 | 11/2004 | Grove et al. | |
| 6,832,260 B2 * | 12/2004 | Brabson et al. ............... 709/230 |
| 7,650,427 B1 * | 1/2010 | Liu et al. ....................... 709/238 |
| 7,672,236 B1 * | 3/2010 | Karunakaran et al. ..... 370/230.1 |
| 7,689,710 B2 | 3/2010 | Tang et al. | |
| 7,698,458 B1 | 4/2010 | Liu et al. | |
| 7,822,862 B2 | 10/2010 | Slater et al. | |
| 7,831,731 B2 | 11/2010 | Tang et al. | |
| 8,244,864 B1 * | 8/2012 | Bahl et al. ..................... 709/225 |
| 2002/0188740 A1 * | 12/2002 | Tang et al. ..................... 709/230 |
| 2005/0267970 A1 * | 12/2005 | Sugizaki ....................... 709/225 |
| 2008/0095182 A1 * | 4/2008 | Elzur et al. ..................... 370/412 |
| 2009/0271613 A1 * | 10/2009 | Brabson ........................ 713/151 |

\* cited by examiner

*Primary Examiner* — Shirley Zhang
(74) *Attorney, Agent, or Firm* — Los Angeles Patent Group; Arman Katiraei

(57) ABSTRACT

Some embodiments provide a director agent, a server agent, and a specialized hand-off protocol for improving scalability and resource usage within a server farm. A first network connection is established between a client and the director agent in order to receive a content request from the client from which to select a server from a set of servers that is responsible for hosting the requested content. A second network connection is established between the server agent that is associated with the selected server and a protocol stack of the selected server. The first network connection is handed-off to the server agent using the specialized hand-off protocol. The server agent performs network connection state parameter transformations between the two connections to create a network connection through which content can be passed from the selected server to the client without passing through the director.

19 Claims, 9 Drawing Sheets

NETWORK CONNECTION HAND-OFF USING STATE TRANSFORMATIONS

TECHNICAL FIELD

The present invention relates to systems and methods for performing hand-off of a network connection.

BACKGROUND ART

Network data transfer facilitates much of the distribution of digital content today. Through the Internet and other such networks, computers, electronic devices, and other network enabled appliances receive news, music, videos, games, data, communications, etc. from any number of content providers located throughout the world. As the number of clients (i.e., content requestors) increases and as the size of the content being distributed increases, so too does the amount of resources that are needed to distribute such content. Consequently, content providers have turned to server farms and Content Delivery Networks (CDN) to provide the necessary resources to accommodate the increasing demands of content requesting clients.

FIG. 1 is an exemplary server farm architecture 105 used by content providers and CDNs. More specifically, the architecture 105 is representative of a particular point-of-presence (POP) of a content provider or a CDN which may have many such POPs geographically distributed. The architecture 105 includes a core router 110, multiple directors 120, and multiple servers 130.

The core router 110 attaches the POP to an external network such as the Internet and routes Internet Protocol (IP) datagrams in to and out from the POP. In many instances, the core router 110 distributes incoming IP datagrams to the directors 120 based on a hash of the source address contained in the datagrams. The core router 110 is a device available from a number of vendors including but not limited to Cisco Systems, Juniper Networks, and Brocade.

The directors 120 perform load-balancing functionality to distribute load to the servers 130. When selecting which server of the set of servers 130 to distribute load to, the directors 120 may use any load-balancing algorithm, such as a round-robin distribution algorithm or more complicated algorithms that take into account the status of each server in the set of servers 130. The directors 120 include commercially available load-balancing equipment that are often built using Intel® servers running Linux. The load-balancing functionality may be implemented using a Linux kernel module known as Linux Virtual Server (LVS).

The servers 130 host content from one or more content providers. The hosted content can be mirrored across each server of the set of servers 130 or can be segmented such that each server of the set of servers 130 is responsible for distributing unique content. The servers 130 include large amounts of persistent storage in the form of solid-state drives and traditional disk drives.

While the server farm architecture 105 of FIG. 1 and other similar architectures can be scaled to meet increased demand, inherent architectural shortcomings result in inefficient usage of resources and poor scalability. FIGS. 2 and 3 below illustrate some of the shortcomings affecting scalability in a typical server farm architecture. Specifically, FIGS. 2 and 3 illustrate common methods of operating a server farm architecture and the shortcomings associated with these operational methods.

In FIG. 2, a director 210 establishes a network connection 220 with a client 230 in order to receive a content request from the client 230. The network connection 220 may include a Transmission Control Protocol (TCP) connection and the content request may include a HyperText Transfer Protocol (HTTP) request that is sent over the TCP connection. The content request identifies the particular content being requested by the client 230. Upon receiving the content request, the director 210 makes an intelligent routing decision to determine which server of the set of servers is responsible for hosting the requested content. In this method of operation, the same content need only be cached or hosted at a single server and all requests for that content are served from that server, thereby maximizing the storage utilization of the servers. Moreover, this creates strong locality of reference in the server farm and increases performance substantially over essentially random routing algorithms.

In FIG. 2, the director 210 determines that server 240 is responsible for hosting the requested content. The director 210 then establishes a second network connection 250 with the selected server 240 in order to forward the content request to the selected server 240. Upon receiving the content request, the selected server 240 distributes the requested content to the client 230. The selected server 240 may retrieve the requested content from an origin server when the content has not been previously cached in its local storage or the selected server 240 may distribute the content from its local storage when the content has been previously stored or cached to the server's storage. The requested content is passed from the server 240 to the client 230 through each of the established network connections 220 and 250.

In this method of operation, resources of the director 210 are unnecessarily consumed (i) by maintaining at least two network connections (see 220 and 250 of FIG. 2) for each client or for each content request and (ii) by having the requested content be forwarded through the director 210 in order to reach the client 230. This consumes critical resources of the director 210 including processing cycles, memory, and network bandwidth. As a result, the director 210 is limited in the number of content requests that it can handle as its resources are also being consumed maintaining network connections and forwarding content back to the client. This further degrades the overall performance within the server farm as the internal passage of content between the server and the director occupies inter-POP bandwidth that is otherwise needed by other directors in routing content requests to the servers. This also increases the cost of operating the server farm as each director is capable of handling fewer incoming requests and additional bandwidth is needed to handle the inter-POP traffic.

FIG. 3 illustrates an alternative method of operating a server farm. In this figure, the director 310 performs basic load-balancing functionality to distribute load across the set of servers. Specifically, the director 310 does not terminate a network connection with the client 320. As a result, the director 310 does not receive and does not inspect the content request from the client 320, and the director 310 is therefore unable to base its load-balancing decision on which server of the set of servers is responsible for hosting the requested content. Rather, the load-balancing decision is based on other factors such as which server is least loaded or has the fewest active network connections as some examples.

In this figure, the director 310 forwards packets from the client 320 to the server 340. The server 340 establishes a first network connection 330 with the client in order to receive the content request from the client 320. The server 340 then performs a routing procedure to identify which server of the set of servers is responsible for hosting the requested content. As noted above, by ensuring that each server uniquely hosts content, usage of the storage resources of the set of servers is maximized since the same content is not redundantly stored at multiple servers.

When the server 340 is responsible for hosting the requested content, the requested content is passed through the network connection 330 to the client 320. However, it is likely that the server 340 does not host the requested content. In this figure, the server 340 identifies server 350 as the appropriate server for hosting the requested content. Therefore, a second network connection 360 is established between the server 340 and the server 350. The content request is forwarded from the server 340 to the server 350. A proxy-HTTP connection may facilitate the forwarding of the content request over the network connection 360. The server 350 will attempt to satisfy the request from cache. If the requested content is not present in cache, the server 350 retrieves the content from an origin server using a third network connection (not shown). The server 350 forwards the requested content through the network connection 360 to the server 340, which then forwards the requested content outside the server farm to the client 320.

In this method of operation, resources of the directors are no longer consumed in forwarding content from the servers to the clients. This is because the first network connection 330 is established between the server 340 and the client 320 and the content can be passed through this connection 330 using direct server return, direct routing, or IP forwarding techniques in a manner that avoids the director 310 as a hop. Moreover, other resources of the directors are freed as the directors no longer have to maintain multiple network connections. Accordingly, resources of the directors are fully dedicated to performing load-balancing functionality. However, this method of operation requires that a second level of load-balancing be introduced at the servers so that the content request can be forwarded to the appropriate server that is responsible for hosting the requested content. Therefore, when the server selected by the directors is not responsible for hosting the requested content, the requested content will still pass through the server farm's internal network twice (e.g., passing content from the server 350 to the server 340 before passing to the client). This requires the server farm operator to incur high monetary and operational costs to maintain at least a 2-to-1 ratio of internal-to-external bandwidth capacity. Furthermore, resources of the servers are unnecessarily consumed in maintaining network connections amongst other servers of the set of servers.

Accordingly, there is need to reduce resource usage in the server farm in order to improve the scalability of the server farm. More specifically, there is need for a server farm or CDN architecture and operational method that intelligently routes user content requests to the appropriate hosting server without the need to redundantly forward the requested content within the server farm and without the need to maintain multiple network connections for each content request.

SUMMARY OF THE INVENTION

Some embodiments provide a director agent, a server agent, and a specialized hand-off protocol for improving scalability and resource usage within a server farm or Content Delivery Network (CDN). The director agent and the server agent include software processes or machines that operate to enhance functionality of existing directors and servers of the server farm or CDN. Together, the director agent and the server agent facilitate (i) the intelligent routing of content requests to an appropriate server with minimal network connection overhead at the directors and (ii) optimally serving the requested content from a server that is responsible for hosting the content to the requesting client without redundant transmission of the content between components within the server farm or CDN.

In some embodiments, the director agent operates in conjunction with one or more directors of the server farm or CDN to establish Transmission Control Protocol (TCP) connections with various clients. Through an established TCP connection, the director agent receives a content request from a client. The director agent in conjunction with the director performs an intelligent routing procedure based on the content request to identify which server of a set of servers hosts the requested content. When a server from the set of servers is selected, the director agent sends a hand-off request using the specialized hand-off protocol to a server agent that operates in conjunction with the selected server. The specialized hand-off protocol is referred to as a transport hand-off protocol (THP) in some embodiments. In some embodiments, the hand-off request is for transferring the TCP connection from the director agent to the server agent that is associated with the selected server. In some embodiments, the hand-off request includes a summary of the TCP connection state along with the client's initial request. The director agent queues any incoming TCP segments that are associated with the connection while awaiting a hand-off reply from the server agent.

The server agent receives the hand-off request and uses the information in the request to establish a new TCP connection with the native TCP/IP protocol stack of the selected server. The native protocol stack of the selected server is unmodified and may include any standard compliant TCP/IP stack. Once the TCP connection is established between the server agent and the native protocol stack of the selected server, the server agent passes the client's content request to the server's native protocol stack. When the client's content request is acknowledged by the server's native protocol stack, the server agent sends a hand-off reply to the director agent indicating a successful TCP connection hand-off and the server agent enters transformation mode.

In response to the hand-off reply, the director agent forwards any queued TCP segments to the server agent and the director agent enters forwarding mode. In some embodiments, the director agent's forwarding mode involves sending TCP segments that are associated with the transferred connection to the selected server. No other processing of the TCP segments is required by the director or the director agent once the director agent enters forwarding mode.

In some embodiments, the server agent operates in the transformation mode to transform various pieces of TCP state from the parameter values that were offered by the director agent when the connection was initially created with the client to the parameter values that were created when the server agent initiated the new connection with the server's native protocol stack. In some embodiments, the server agent performs one of at least three transformations to the TCP segments produced by the server's native protocol stack. In some embodiments, the TCP sequence number is transformed from the server's sequence space to the director's sequence space. This involves computing the difference between the director agent's and server native protocol stack's initial sequence number and then adding the difference to the sequence number carried in the TCP segment. In addition, the window and the window scale factor offered by the director agent during initial connection setup may differ from the window and window scale factor offered by the server's native protocol stack during the creation of the new connection by the server agent. Accordingly, in some embodiments, the server agent performs a transformation such that the window offered by the server's native protocol stack is unscaled according to the scale factor offered by the server's native protocol stack and then rescaled using the scale factor offered by the director. In some embodiments, when the TCP timestamp option is negotiated, the timestamp value (TS-VAL) field of the TCP timestamp option contained in the TCP segments sent by the server's native protocol stack are transformed from the server's TSVAL space into the director's TSVAL space. The server agent computes the difference between the director agent's initial TSVAL and the server native protocol stack's initial TSVAL and the server agent adds the computed value to the TSVAL carried in the TCP segment.

In some embodiments, the server agent performs one of at least three transformations to the TCP segments that are received from the client before they are delivered to the server's native protocol stack. In some embodiments, the server agent transforms the acknowledgment number from the director's sequence space to the server's sequence space. This involves computing the difference between the director agent's initial sequence number and the server native protocol stack's initial sequence number and then subtracting the difference from the acknowledgment number carried in the TCP segment. In some embodiments, when the TCP segment is carrying a TCP Selective Acknowledgement (SACK) option, the server agent transforms the sequence numbers in the SACK option from the director agent's sequence space to the server native protocol stack's sequence space. In some embodiments, when the TCP timestamp option is in use, the server agent transforms the Timestamp Echo Reply (TSECR) field of the TCP timestamp option from the director agent's TSVAL space to the server native protocol stack's TSVAL space. In some embodiments, the checksum of the modified TCP segments is modified to reflect changes to the contents of the server native protocol stack's TCP segments and the client's TCP segments. In some embodiments, the server agent incrementally updates the checksum to reflect the changes to the modified fields of the TCP segments' header rather than recompute the checksum over the entire modified TCP segment.

BRIEF DESCRIPTION OF THE DRAWINGS

In order to achieve a better understanding of the nature of the present invention, a preferred embodiment for the director agent, server agent, and specialized hand-off protocol will now be described, by way of example only, with reference to the accompanying drawings in which.

DETAILED DESCRIPTION

In the following detailed description, numerous details, examples, and embodiments of the director agent, server agent, and specialized hand-off protocol are set forth and described. As one skilled in the art would understand in light of the present description, the director agent, server agent, and specialized hand-off protocol are not limited to the embodiments set forth, and these may be practiced without some of the specific details and examples discussed. Also, reference is made to accompanying figures, which illustrate specific embodiments in which the invention can be practiced. It is to be understood that other embodiments can be used and structural changes can be made without departing from the scope of the embodiments herein described. For example, the director agent, server agent, and the specialized hand-off protocol can be adapted for use in an Internet Protocol version 4 (IPv4) or IP version 6 (IPv6) network. The term "packet" as used in the description, figures, and embodiments presented herein is used interchangeably to refer to packets that include blocks of variable length data, Internet Protocol (IP) datagrams, Transmission Control Protocol (TCP) segments, frames, and other data structures for passing data across a network.

I. Overview

Server farms have been developed to distribute highly demanded digital content. Server farms are comprised of several virtual servers or physical servers that collectively operate to create a pool of scalable resources that can accommodate the demands of thousands of simultaneous clients requesting the same or different content. Each server of the server farm may include one or more processors, volatile and non-volatile memory, and network connectivity. A content provider, such as a video hosting site, may have several server farms that are geographically distributed such that each server farm optimally serves video content to a particular region.

Rather than maintain one or more server farms to distribute content, a content provider may leverage the resources of a Content Delivery (CDN) to distribute the content on its behalf. In essence, a CDN is a collection of server farms that may be geographically distributed to reliably and efficiently deliver content to end user clients on behalf of different content providers. A CDN has multiple Points-Of-Presence (POP). Each POP can target clients at a specific region in order to optimally serve content to the clients at that region. Specifically, by locating a server farm that is associated with a CDN POP near a particular region, the clients at that particular region will be able to retrieve content from the CDN POP with less latency, jitter, and overall delay than from a more distant server.

Figure 1:
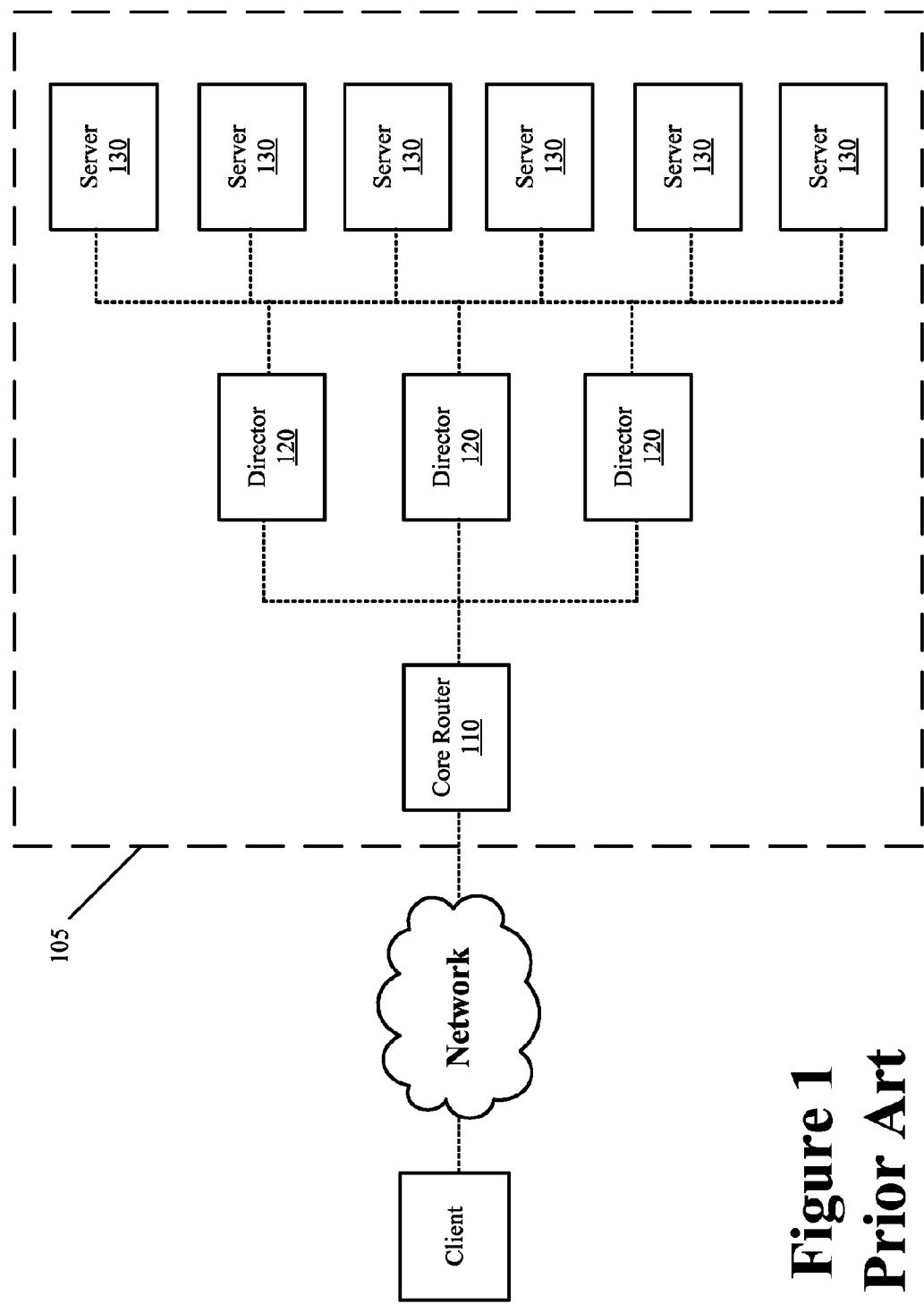
FIG. 1 is an exemplary server farm architecture used by content providers and CDNs.
Figure 2:
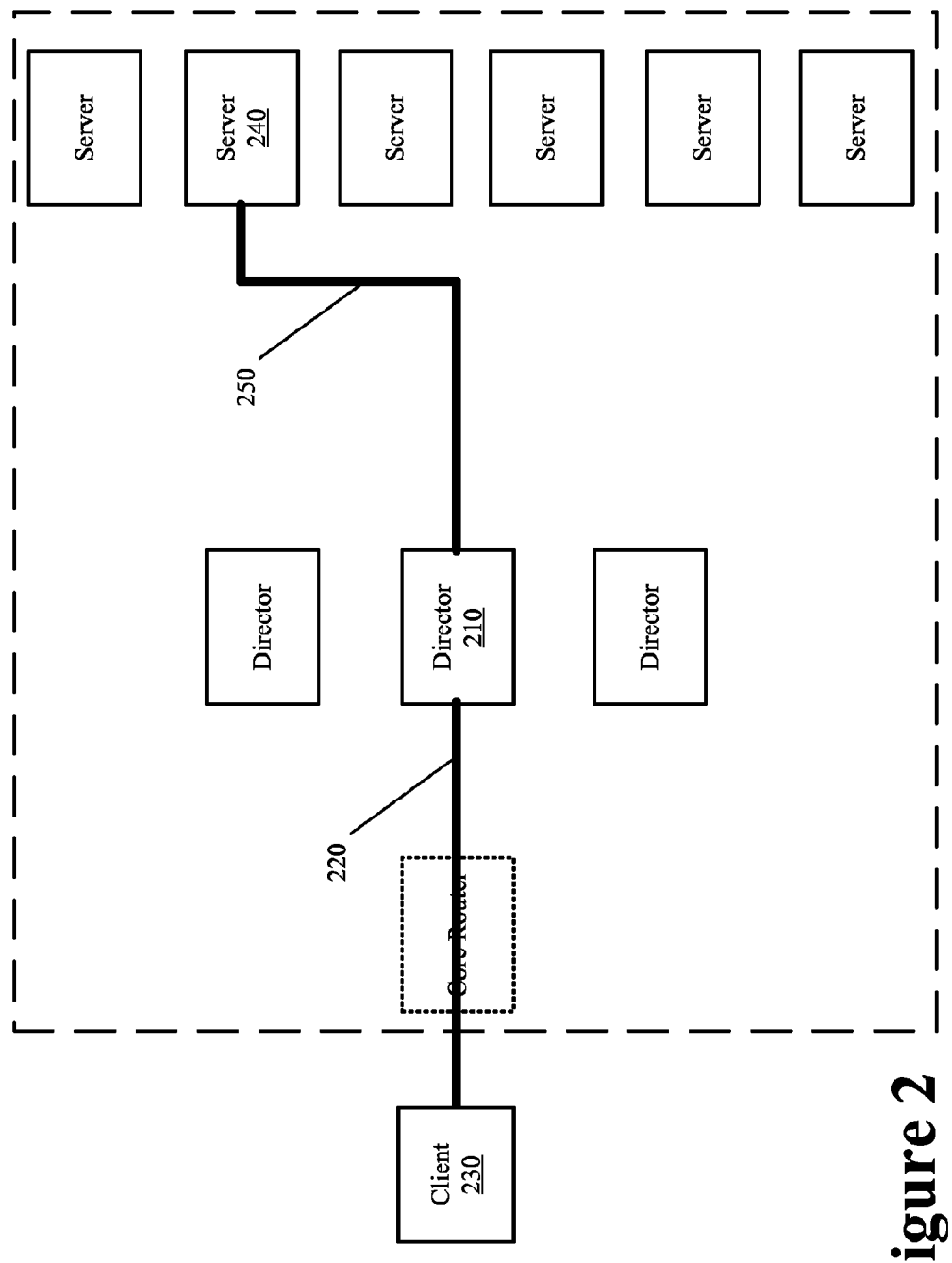
FIGS. 2 and 3 illustrate common methods of operating a server farm architecture and the shortcomings associated with these operational methods.
Figure 3:
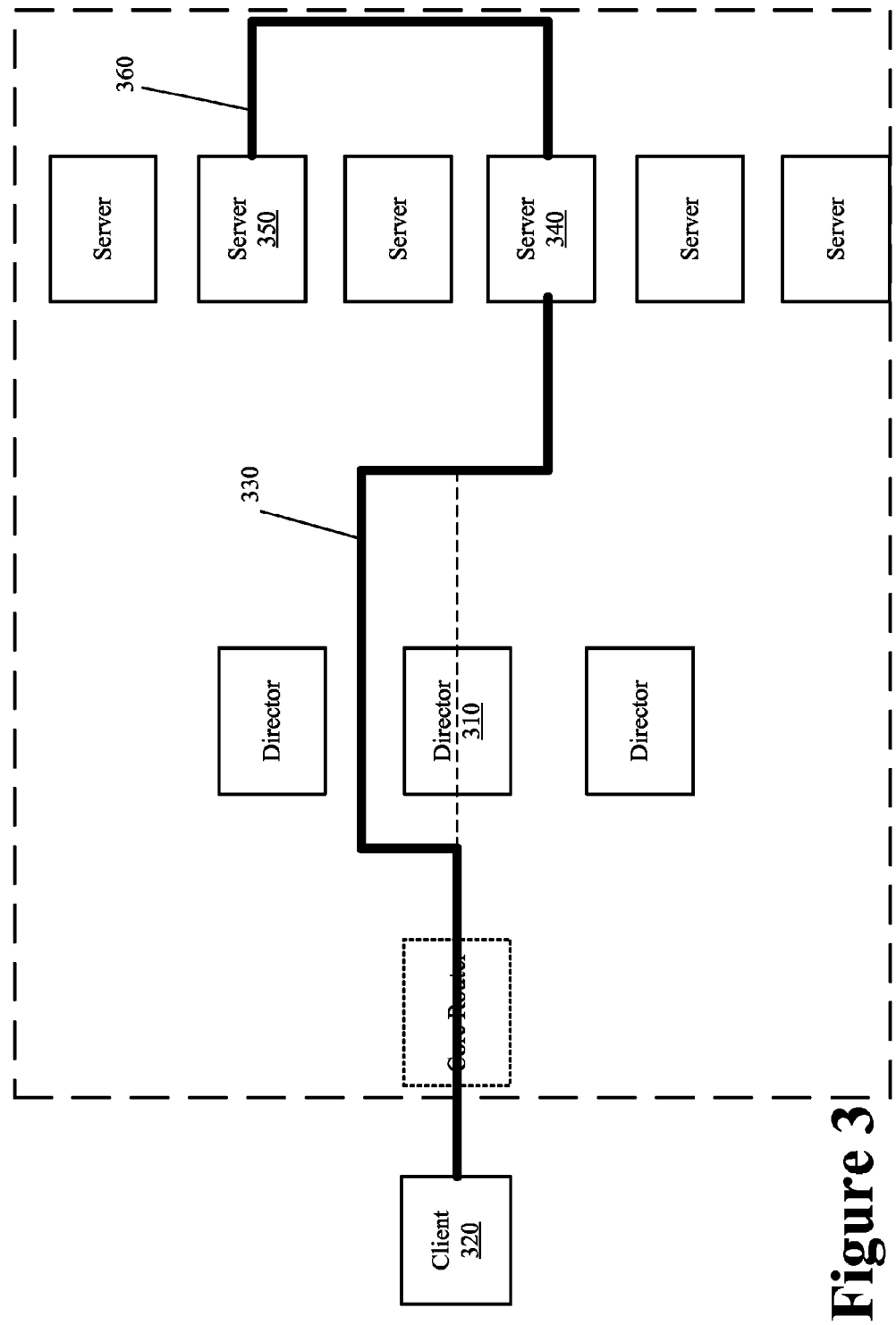

However, as shown with reference to FIGS. 2 and 3, traditional methods of operating a server farm result in wasted resources and poor scalability which increase the cost of operating the server farm. Accordingly, it is an objective of the present invention to maximize usage of resources at a server farm while also improving the scalability of the server farm with minimal impact to the existing architecture. To do so, some embodiments provide a director agent, a server agent, and a specialized hand-off protocol. These system enhancements and their corresponding methods of operation are applicable to any server farm or CDN architecture that includes at least one director and multiple servers. A director includes a device that performs load-balancing functionality and a server includes a device that hosts and distributes content (e.g., a caching server). The directors and servers may include physically separate devices or may include virtual servers that collectively operate using shared or partitioned resources of one or more physical machines. Moreover, functionality of a director may be integrated with functionality of a server to operate as a single device or as a single logical unit.

Figure 4:
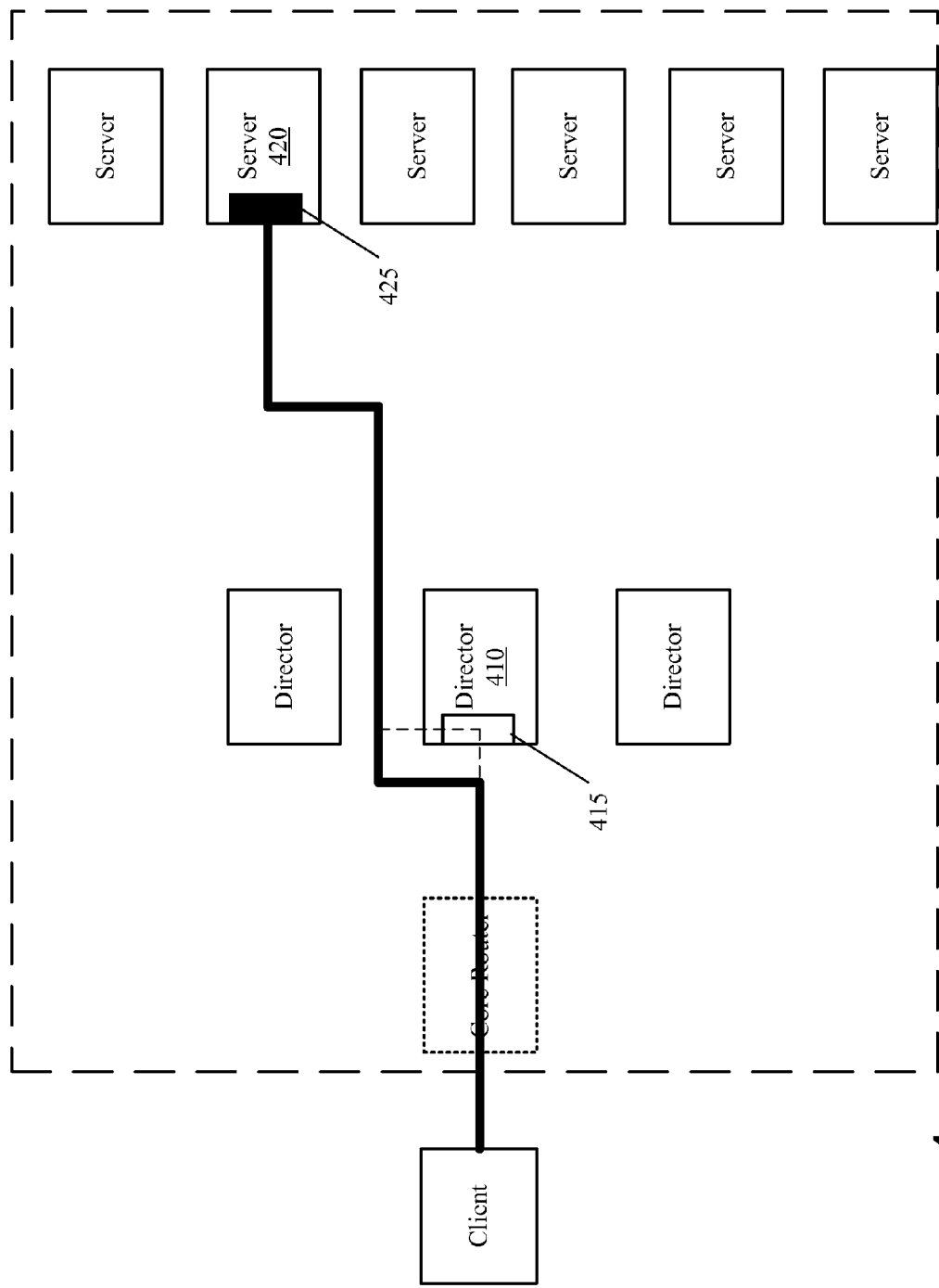
FIG. 4 illustrates operation of a director agent and a server agent in a server farm in accordance with some embodiments.

FIG. 4 illustrates operation of a director agent 415 and a server agent 425 in a server farm in accordance with some embodiments. As shown, the server farm includes a director 410 of a set of directors and a server 420 of a set of servers.

The director agent 415 modifies operation of the director 410 by facilitating the hand-off of an established network connection with a client to an appropriate server. The director agent may perform different operations in different embodiments depending on the existing functionality of the director.

In embodiments where the director 410 does not establish a network connection with a client in order to receive a content request upon which to base its load-balancing or routing decision, the director agent 415 analyzes the incoming packets to the director 410 prior to the director 410 forwarding them. The director agent 415 identifies and intercepts any network connection establishment requests. When a network connection establishment request is identified, the director agent 415 performs a network connection establishment procedure to establish a network connection with the requesting client. This may include establishing a Transmission Control Protocol (TCP) connection or a Stream Control Transmission Protocol (SCTP) connection by performing a handshaking procedure with the client.

Once a network connection is established with a client, the director agent 415 monitors for an incoming content request from that client. In this figure, the director agent 415 establishes a network connection (e.g., a TCP connection) with a content requesting client 430 and the director agent 415 receives a content request from the client 430 over the established network connection. The director agent 415 analyzes the content request to identify the appropriate server from the set of servers that is responsible for hosting the requested content. As shown, server 420 is identified as the server that is responsible for hosting the requested content. The director agent 415 then performs the network connection hand-off.

In other embodiments where the director 410 does establish a network connection with a client in order to receive a content request upon which to base its load-balancing or routing decision, the director agent 415 identifies a newly established network connection by the director 410 and which server of the set of servers is selected by the director 410 to satisfy the received content request. The director agent 415 then operates in conjunction with the director 410 to perform the network connection hand-off.

To perform the hand-off, the director agent 415 passes a hand-off request to the server agent 425 that is associated with the selected server 420. The hand-off request is passed using a specialized hand-off protocol of some embodiments that encapsulates (1) various network connection state parameters and (2) the client's content request in the hand-off request message. The hand-off request is passed without establishing a network connection between the director agent 415 and the server agent 425. In some embodiments, the hand-off request is passed using a stateless or connectionless oriented protocol such as User Data Protocol (UDP). In some embodiments, the specialized hand-off protocol is referred to as the transport hand-off protocol (THP). THP may include options to identify and carry connection state parameters for different protocols such as TCP, SCTP, Secure Sockets Layer (SSL), etc.

The server agent 425 further facilitates the hand-off of the established network connection by establishing a network connection with the native protocol stack of the server 420. Once established, the server agent 425 sends a hand-off reply to the director agent 415 to cause the director agent 415 to begin forwarding all packets associated with the connection that is to be handed-off to the server agent 425. The server agent 425 performs network connection state transformations to complete the hand-off and to translate the network connection that is between the client and the server agent 425 and the network connection that is between the server agent 425 and the native protocol stack of the server 420. Specifically, the network connection state transformations modify various header fields so that parameter values for the header fields of outgoing packets (i.e., packets sent to the client) match expected parameter values for those header fields at the client and parameter values for the header fields of incoming packets (i.e., packets sent from the client) match expected parameter values for those header fields at the server 420.

The above method of operating a server farm in conjunction with the director agent, the server agent, and the specialized protocol of some embodiments provide several advantages over current methods of operating a server farm including those described above with reference to FIGS. 2 and 3. Firstly, in performing the hand-off of the already existing network connection, the director 410 and the director agent 415 no longer need to maintain a network connection with each requesting client and no longer need to maintain the network connection for the duration of the content transfer. Consequently, resources of the director and director agent are freed and these resources can be dedicated to performing the above described server selection and network connection hand-off. This improves upon the scalability of the server farm by allowing each director to handle more requests simultaneously.

Secondly, the network connection hand-off is performed without modifying native protocol stacks of existing equipment including those of the directors and servers of the server farm. Accordingly, any director, server, or other such network equipment can be modified with a director agent or server agent. Existing equipment can therefore be adapted for use with the embodiments described herein.

Thirdly, unnecessary and bandwidth intensive passage of content internally within the server farm is eliminated as there is no longer an intermediate hop in the server farm between the server hosting the content and the client requesting the content. Instead, the network connection hand-off results in a connection that is terminated at the requesting client and the appropriate hosting server. By using direct server return, direct routing, or IP forwarding techniques, the handed-off network connection can be used to forward requested content from the appropriate server to the requesting client while avoiding the directors of the server farm as an intermediate hop. Moreover, by first establishing the network connection between the client and the director or director agent in order to receive the content request from the client, intelligent routing decisions about which server of the set of servers is responsible for hosting the requested content can be made. This eliminates the need for additional routing to be performed at the servers and also eliminates inter-server network connections and inter-server content passage as the server selected by the director is guaranteed to be responsible for hosting the requested content. This greatly reduces the amount of internal traffic within the server farm and as a result, reduces the bandwidth requirements needed to operate the server farm.

Fourthly, the director agent and the server agent incur minimal overhead in handing-off the network connection and in retaining the network connection state parameters used when performing the transformations. The director and the selected server can continue their respective operations unaltered, thereby incurring no additional overhead to support the techniques described herein. This is in contrast to other methods that employ network connection migration techniques whereby the director and/or server opens and maintains one or more sockets for each network connection that is migrated. When scaled to several hundred or several thousand migrated network connections, the overhead incurred by opening and maintaining the sockets greatly degrades performance at the director and the server. Using the specialized hand-off protocol of some embodiments, the hand-off occurs without any sockets being opened. Instead, a single request and reply stateless message exchange occurs between the director agent and the server agent.

II. Director Agent

In some embodiments, the director agent is a software process or separate physical machine that operates to enhance functionality of a director or other device that performs load-balancing functionality in a server farm or CDN. The director agent may be implemented as a kernel module or as kernel code that integrates with an existing kernel of the director. In some embodiments, the director agent is implemented as a network filter extension (e.g., Netfilter extension) that provides access to and that processes network packets passing through the native protocol stack of the director. The director agent can be implemented to execute on commercial operating systems, such as Microsoft Windows, Linux, etc. or on proprietary closed systems. The native protocol stack of the director includes any IPv4 protocol stack, IPv6 protocol stack, or dual-stack protocol implementation that conforms to industry standards (e.g., TCP/IP protocol stack). In some embodiments, the director agent is addressed using the same IP address as the associated director. In some other embodiments, the director agent is provided with a distinct IP address than the associated director.

Figure 5:
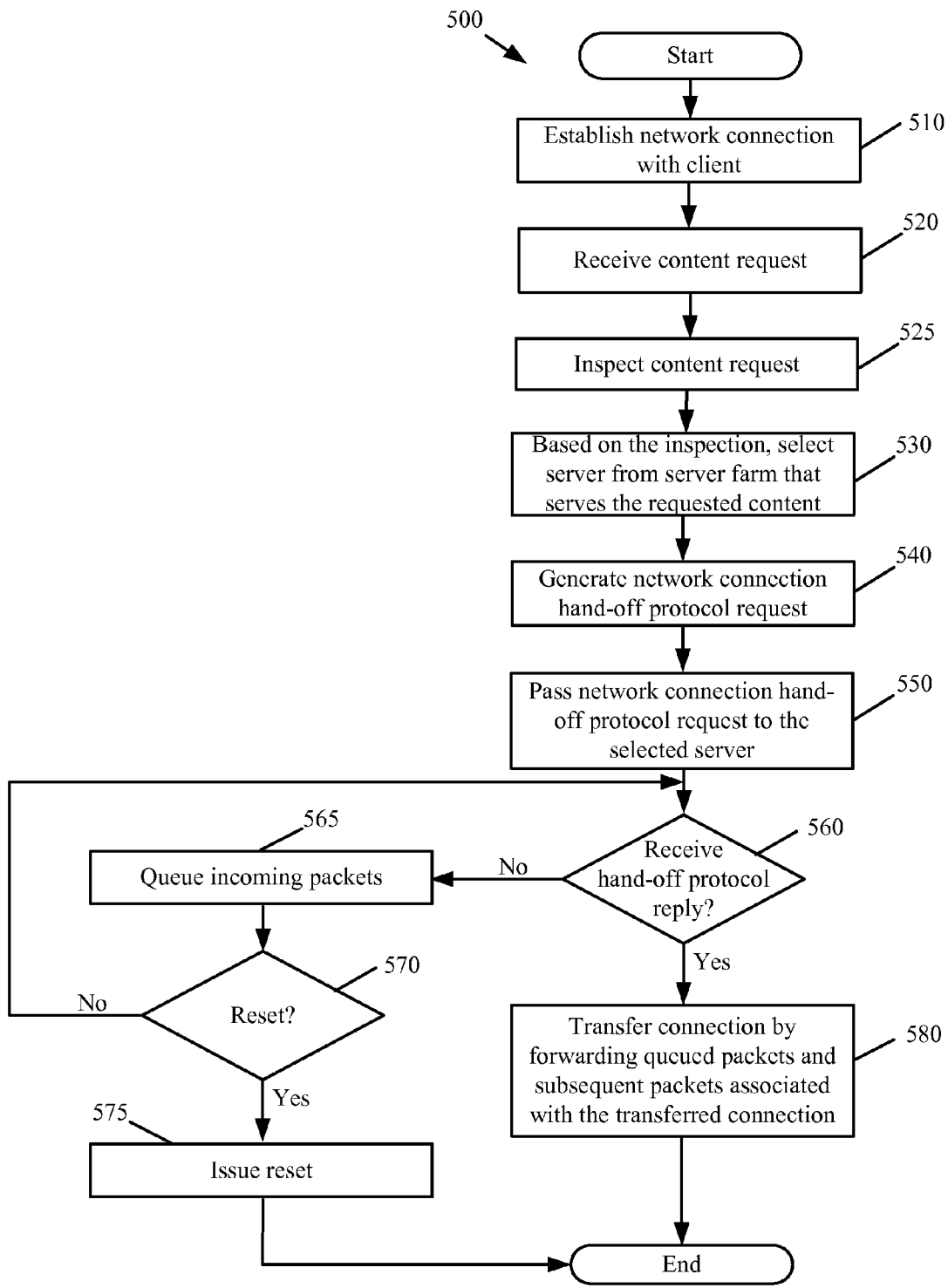
FIG. 5 presents a process performed by the director agent in accordance with some embodiments.

FIG. 5 presents a process 500 performed by the director agent in accordance with some embodiments. The process 500 begins when a client attempts to establish a network connection in order to submit a content request. To send the network connection establishment request, the client first identifies an Internet Protocol (IP) address that is associated with a director that the director agent operates in conjunction with. The IP address can be obtained using Domain Name System (DNS) resolution or redirection as some examples. The IP address may include a virtual IP address or a real IP address. The client then sends a connection establishment request packet to the director. In some embodiments, this includes sending a TCP SYN packet to commence a TCP handshaking procedure. In the discussion to follow, TCP is used for exemplary purposes. Accordingly, it should be apparent to one of ordinary skill in the art that any connection oriented protocol may be used to establish the network connection, including the SSL protocol and SCTP as some examples.

The director agent identifies the network connection establishment request as it is received by the director and the director agent establishes (at 510) the network connection with the client. This may include completing the TCP handshaking procedure or other connection establishment procedure. In some embodiments, the director establishes the connection on behalf of the director agent. In some such embodiments, the director agent monitors for connections that are newly established with the director.

Next, the process receives (at 520) a content request from the client over the established connection. To do so, the director agent may analyze packets that are received over the established connection or the director agent may intercept packets passing through the protocol stack of the director to identify packets associated with the established connection. In some embodiments, the content request is a HyperText Transfer Protocol (HTTP) request. However, it should be apparent that the process may be adapted to receive and identify content requests submitted using other protocols such as the File Transfer Protocol (FTP).

When a content request is received, the process inspects (at 525) the content request. This may include identifying various network connection state parameter values. Such identification can be performed by doing a layer seven inspection to analyze HTTP header fields of an HTTP content request and also to analyze parameter values for various TCP header fields. Other fields or other protocols may also be inspected using different analysis techniques. The inspection also identifies the content being requested (e.g., a filename or a pathname) and the origin server where the content is located as some examples. In some embodiments, the director agent temporarily stores the identified network connection state parameter values and the content request.

Based on the inspection, the process selects (at 530) a server from the set of servers of the server farm that is responsible for hosting the requested content. This is accomplished using one or more different routing procedures. The Cache Array Routing Protocol (CARP) is an example of one such routing procedure. In some embodiments, CARP uses a hash of the Uniform Resource Locator (URL) in the content request in combination with a hash of the servers' Full Qualified Domain Name (FQDN) and a load-factor to select which server should satisfy the client's request. However, any routing algorithm, hashing algorithm, extension matching, or regular expression may be used to select the server from the set of servers without loss of functionality. For example, a URL or hostname associated with the content request can be used in conjunction with a hashing algorithm to identify the server that is responsible for hosting the requested content. In embodiments where the director, instead of the director agent, selects the appropriate server, the director agent monitors the selection to identify which server is selected.

The process generates (at 540) a network connection hand-off request to transfer the network connection to the selected server. In some embodiments, the network connection hand-off request encapsulates a summary of the network connection state along with the client's initial content request. The summary of the network connection state includes information such as header parameter values. For example, when the summary includes network connection state information about a TCP connection, the summary includes a sequence number, an acknowledgement number, a window size, and optional header values that are associated with the TCP connection. More specifically, the summary includes the initial values used for the sequence number, acknowledgement number, window size, and optional header values. This information may be delimited using specialized tags such that the complete state information is passed in the payload of a single network connection hand-off request packet. For embodiments where the connection to be transferred is a TCP connection, the THP hand-off request would contain a TCP hand-off request option to identify the inclusion of TCP connection state parameters. In some embodiments, the summary and content request within the network connection hand-off request message is compressed to minimize the size of the message being transferred.

The process passes (at 550) the network connection hand-off request to the selected server. Specifically, the director agent passes the hand-off request to the server agent that is associated with the selected server. In some embodiments, the server agent is addressed using the same IP address as the selected server. In some such embodiments, a different port number or other identifier may be used to identify that the request is intended for the server agent. In some embodiments, the request is generated and passed using a specialized protocol of some embodiments. This protocol may be a stateless protocol that relies on a request and a reply message exchange with no additional overhead. For example, the network connection hand-off request is generated and passed using a lightweight protocol such as the User Datagram Protocol (UDP).

The process determines (at 560) whether a network connection hand-off reply message is received in response. When no hand-off reply message is received, the process begins queuing (at 565) incoming packets that are associated with the connection being transferred. The process determines (at 570) whether a reset threshold has been reached. The reset threshold is reached when the hand-off reply is not received within some specified period of time (e.g., 10 ms) after the corresponding hand-off request was sent. This minimal overhead is retained in the director agent until the reset threshold is reached or the hand-off reply is received. The reset threshold is used to identify an error in the network connection hand-off. This may occur if the selected server is offline or the network connection between the director and the selected server is interrupted. In some embodiments, the director agent performs health checks of the various servers in the server farm to ensure that a selected server is operational before it is selected to receive the handed-off network connection.

When the reset threshold is reached (at 570), the process issues (at 575) a reset and the process 500 ends. In some embodiments, issuing the reset involves resending the network connection hand-off request to the same or different server. In some other embodiments, issuing the reset involves deleting stored overhead information about the network connection being transferred and sending a connection reset message to the client. Other error handling procedures may also be performed including diagnostics as to why the reply was not received.

When the reset threshold has yet to be reached (at 570), the process returns to step 560 to determine whether the network connection hand-off reply is received. Once the network connection hand-off reply is received, the process transfers (at 580) the network connection to the selected server by forwarding any queued packets to the selected server and the director enters into a forwarding mode whereby subsequent packets associated with the transferred connection are forwarded to the selected server. No other processing of the packets associated with the transferred connection is required by the director once it enters forwarding mode. In some embodiments, a hand-off end request and reply message exchange mechanism is used to allow the director agent to appropriately respond to state transitions at the server's native protocol stack, such as connection resets, exceptions, or completion notifications. The hand-off end request and reply message exchange mechanism is described in detail below with reference to FIGS. 7*a* and 7*b*.

The specialized hand-off protocol (i.e., THP) of some embodiments provides several advantages over traditional network connection hand-off or migration techniques. Firstly, neither the director nor the director agent opens a socket or incurs any other additional overhead to perform the hand-off. When dealing with hundreds or thousands of content requests, the overhead that is associated with managing hundreds or thousands of open sockets greatly degrades the overall performance of the director. Secondly, the stateless nature of the specialized hand-off protocol eliminates the need to establish a separate network connection between the director agent and the server agent in order to hand-off the existing connection. This again improves the scalability of the director and the director agent as less overhead is needed when performing the hand-off. Thirdly, the hand-off occurs without having to replay the original network connection establishment procedure with the server agent. Replaying the original network connection requires the director agent to store the network connection establishment packets that originate from the client. This also requires the director agent to include a complex state machine. Furthermore, this requires the server to have a modified stack that minors the values provided by the director's stack when establishing the connection with the client.

However, using the specialized hand-off protocol of some embodiments, the hand-off occurs with a single message or packet being passed to the server agent, a single message or packet being received from the server agent, and without the need for any modified stacks.

III. Server Agent

In some embodiments, the server agent is a software process or separate physical machine that operates to enhance functionality of a server or other device that distributes content in a server farm or CDN. The server agent may be implemented as a kernel module or as kernel code that integrates with an existing kernel or processes of the server. In some embodiments, the server agent is implemented as a network filter extension that provides access to and that processes network packets passing through the native protocol stack of the server. The server agent can be implemented to execute on commercial operating systems, such as Microsoft Windows, Linux, etc. or on proprietary closed systems. The native protocol stack includes any IPv4 protocol stack, IPv6 protocol stack, or dual-stack protocol implementation that conforms to industry standards (e.g., TCP/IP protocol stack). In some embodiments, the server agent is addressed using the same IP address as the associated server. In some other embodiments, the server agent is provided with a distinct IP address than the associated server.

Figure 6:
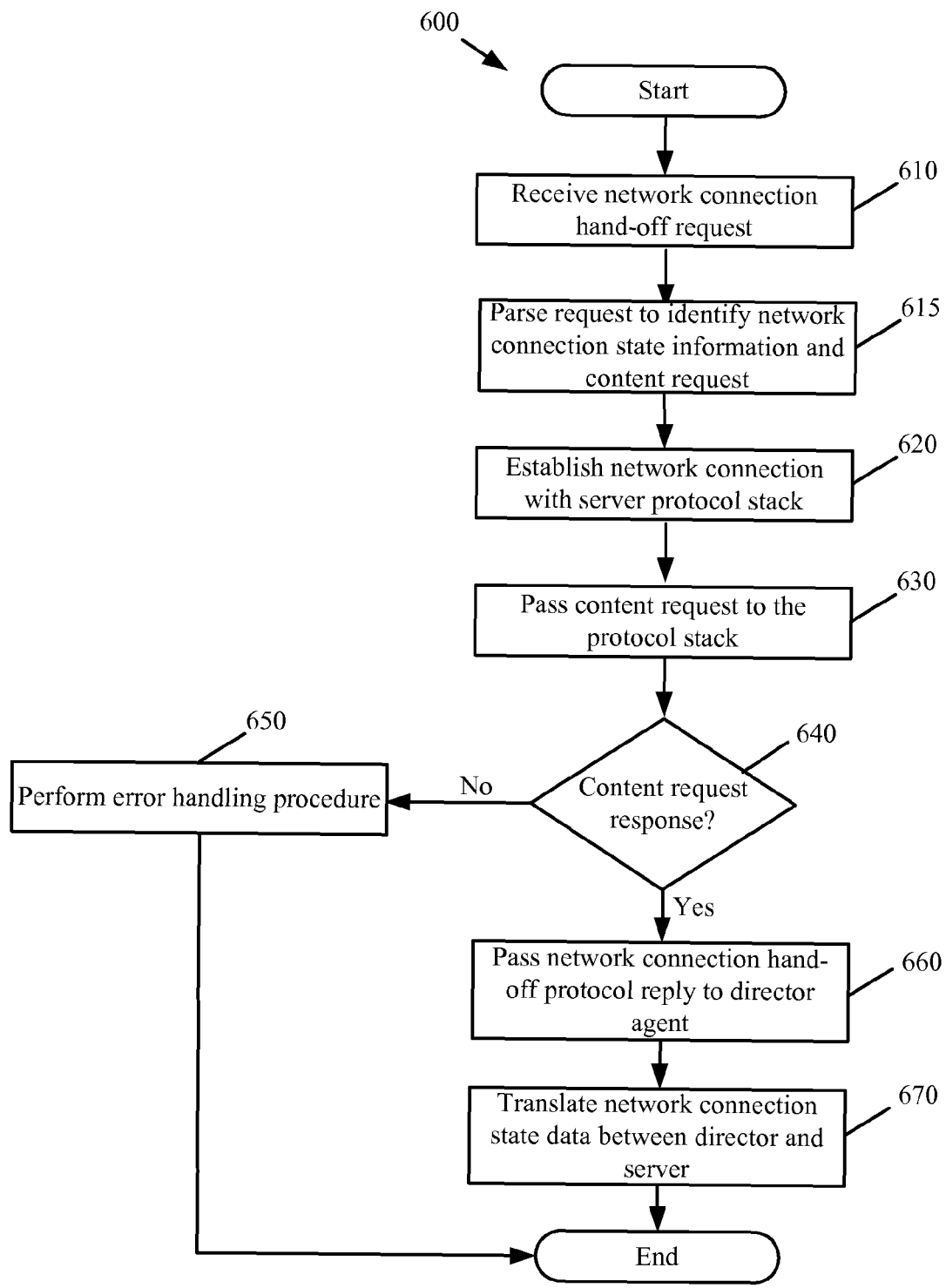
FIG. 6 presents a process performed by the server agent in accordance with some embodiments.

FIG. 6 presents a process 600 performed by the server agent in accordance with some embodiments. The process 600 begins when the server agent receives (at 610) a network connection hand-off request from a director agent. Upon receiving the hand-off request, the process parses (at 615) the request to identify the network connection state parameters as well as the content request. In some embodiments, parsing the request involves scanning the payload to identify various delimiters that are inserted into the payload in order to identify and differentiate the encapsulated connection state parameters and content request. Parsing the request may include decompressing the hand-off request.

Next, the process establishes (at 620) a network connection with the native protocol stack of the server that the server agent operates in conjunction with. In some embodiments, this includes establishing a TCP connection with a TCP/IP protocol stack of the server. There is minimal latency involved in establishing this network connection as the server agent is typically running on the same physical machine as the native protocol stack. It is worth noting that the state parameters that are established for the network connection between the server agent and the native protocol stack will differ from the state parameters for the network connection between the director agent and the client. For example, the sequence numbers and the acknowledgement numbers for the different network connections will differ.

Upon establishing the network connection with the native protocol stack of the server, the process passes (at 630) the content request that is parsed from the network connection hand-off request to the native protocol stack. In some embodiments, the server agent modifies header fields of the content request or modifies the content request data before passing the content request to the native protocol stack. For example, the associated server may be comprised of a front-end and back-end where the front-end performs various load-balancing functionality and the back-end performs hosting and distribution functionality. In some such instances, the back-end is bound to a different port than the front-end. Therefore, in order for the server agent to directly pass the content request to the server back-end, the server agent modifies the destination port header field. The appropriate destination port is identified during the establishment of the network connection between the server agent and the native protocol stack of the associated server. Similar modifications may be performed on other header fields or the content request data as needed.

The process waits (at 640) for a response to the content request. When the response is not received in a specified period of time or an error is detected, the process performs (at 650) an error handling procedure. This may include resending the content request, communicating the error back to the director agent, or redirecting the hand-off request to a different server in the server farm. When the response is received (at 640), the process passes (at 660) a network connection hand-off reply to the director agent. The network connection hand-off reply is referred to as a THP reply in some embodiments. As with the hand-off request, the hand-off reply is a stateless or connectionless oriented message that may be sent using a lightweight protocol such as UDP. The hand-off reply causes the director agent to enter forwarding mode whereby packets associated with the handed-off connection are forwarded from the director or director agent to the server agent without additional processing by the director or director agent. The network connection that was first established between the client and the director or director agent is handed-off such that the same connection is now terminated at the client and at the server agent.

Upon passing the hand-off reply, the server agent enters transformation mode. In the transformation mode, the server agent process transforms (at 670) network connection state parameters such that network connection state parameter values for packets originating from the client match network connection state parameter values that are expected at the client and vice versa. This transformation completes the hand-off of the network connection such that the network connection is effectively terminated at the client and at the server. This is accomplished by translating between (1) the handed-off network connection between the client and the server agent and (2) the network connection between the server agent and the native protocol stack of the server. The requested content can then be sent from the server to the client over the handed-off network connection. More importantly, the requested content can be sent without traversing the director thereby freeing bandwidth and resources of the director from having to unnecessarily forward content to the client. This can be accomplished using direct server return, direct routing, or IP forwarding techniques that are well known in the art.

In some embodiments, the server agent performs one of at least three transformations to the outgoing packets that are sent by the server and that are generated from the server's native protocol stack. The following transformations are described with reference to header fields of TCP packets. These transformations are shown for exemplary purposes and do not limit the scope of applicability. Accordingly, it should be apparent to one of ordinary skill in the art that these transformation techniques can apply to packets of other protocols or to other header fields.

In some embodiments, the sequence number of the TCP packet is transformed from the server's sequence space to the director's sequence space. This involves computing the difference between the director agent's and server native protocol stack's initial sequence number and then adding the difference to the sequence number carried in the TCP packet. For example, if the director agent's initial sequence number is 34213, the server native protocol stack's initial sequence number is 5421, and a TCP packet sent from the server to the client has a sequence number of 5433, then the difference between the director agent's and server native protocol stack's initial sequence number is 28792 (34213-5421) and this value is added to the sequence number that is carried in the TCP packet to produce the transformed sequence value of 34225 (5433+28792) for that TCP packet as it passed from the server agent to the client.

The window and the window scale factor offered by the director agent during initial connection setup may differ from the window and window scale factor offered by the server's native protocol stack during the creation of the new connection by the server agent. Accordingly, in some embodiments, the server agent performs a transformation such that the window offered by the server's native protocol stack is unscaled according to the scale factor offered by the server's native protocol stack and then rescaled using the scale factor offered by the director. The rescaling procedure begins during the initial connection establishment between the director agent and the client. Specifically, when the director agent receives the initial SYN packet from the client, the director agent records the fact that the client wants to use window-scaling and records the shift value, M. The director agent sends a SYN|ACK acknowledging the client's SYN and offering a window, for example 5000, and a window-scale option with a shift value of N. As with the client's initial SYN, the window in the SYN|ACK is unscaled.

When the connection hand-off occurs, the server agent sends a SYN to the server's native protocol stack that has the same initial window and window-scale option as the client offered to the director agent. However, the director agent had to offer a shift value to the client without knowing what the server's native protocol stack might offer as a shift value. If for some reason the server's native protocol stack does not include a window-scale option in its SYN|ACK or it offers a shift value P, that is different than the shift value N, offered by the director agent, then the server agent compensates for the mismatch while avoiding offering a window value that will induce the client to send out-of-window data or a window renege.

In some embodiments, the director agent offers an initial window of 4*MSS (the Linux default of 5840) and if the client requested window-scaling, the director agent responds with a window-scale option with a shift value of 0. In this manner, the director agent avoids selecting a shift value that is greater than the shift value selected by the server's native protocol stack (N>P). If N>P, then it is possible for the server's native protocol stack to offer a window that cannot be represented using the director agent's window shift value. That is, $((win<<P)>>N)=0$.

Additional state transformations may include transforming the TCP timestamp value. In some embodiments, when the TCP timestamp option is negotiated, the timestamp value (TSVAL) field of the TCP timestamp option contained in the TCP packets sent by the server's native protocol stack are transformed from the server's TSVAL space into the director's TSVAL space. The server agent computes the difference between the director agent's initial TSVAL and the server's native protocol stack initial TSVAL and the server agent adds the computed value to the TSVAL carried in the TCP packet.

In some embodiments, the server agent performs one of at least three transformations to the incoming packets that are received from the client before they are delivered to the server's native protocol stack. In some embodiments, the server agent transforms the acknowledgment number from the director's sequence space to the server's sequence space. This involves computing the difference between the director agent's initial sequence number and the server native protocol stack's initial sequence number and then subtracting the difference from the acknowledgment number carried in the TCP packet.

In some embodiments, when the TCP packet is carrying a TCP Selective Acknowledgement (SACK) option, the server agent transforms the sequence numbers in the SACK option from the director agent's sequence space to the server native protocol stack's sequence space. In some embodiments, when the TCP timestamp option is in use, the server agent transforms the Timestamp Echo Reply (TSECR) field of the TCP timestamp option from the director agent's TSVAL space to the server native protocol stack's TSVAL space. In some embodiments, the checksum of the modified TCP packets is modified to reflect changes to the contents of the server native protocol stack's TCP packets and the client's TCP packets. Rather than recompute the checksum over the entire modified TCP packet, the server agent incrementally updates the checksum to reflect the changes to the modified fields of the TCP packets' header.

As noted above, the network connection state transformations can be performed relative to any protocol. As an alternative example, when using SCTP for the network connection, the server agent may perform transformations over the verification tag and checksum header fields of the SCTP header. As such, the above described hand-off may be adapted to other protocols including SSL and FTP as some examples.

IV. Hand-Off

Figure 7A:
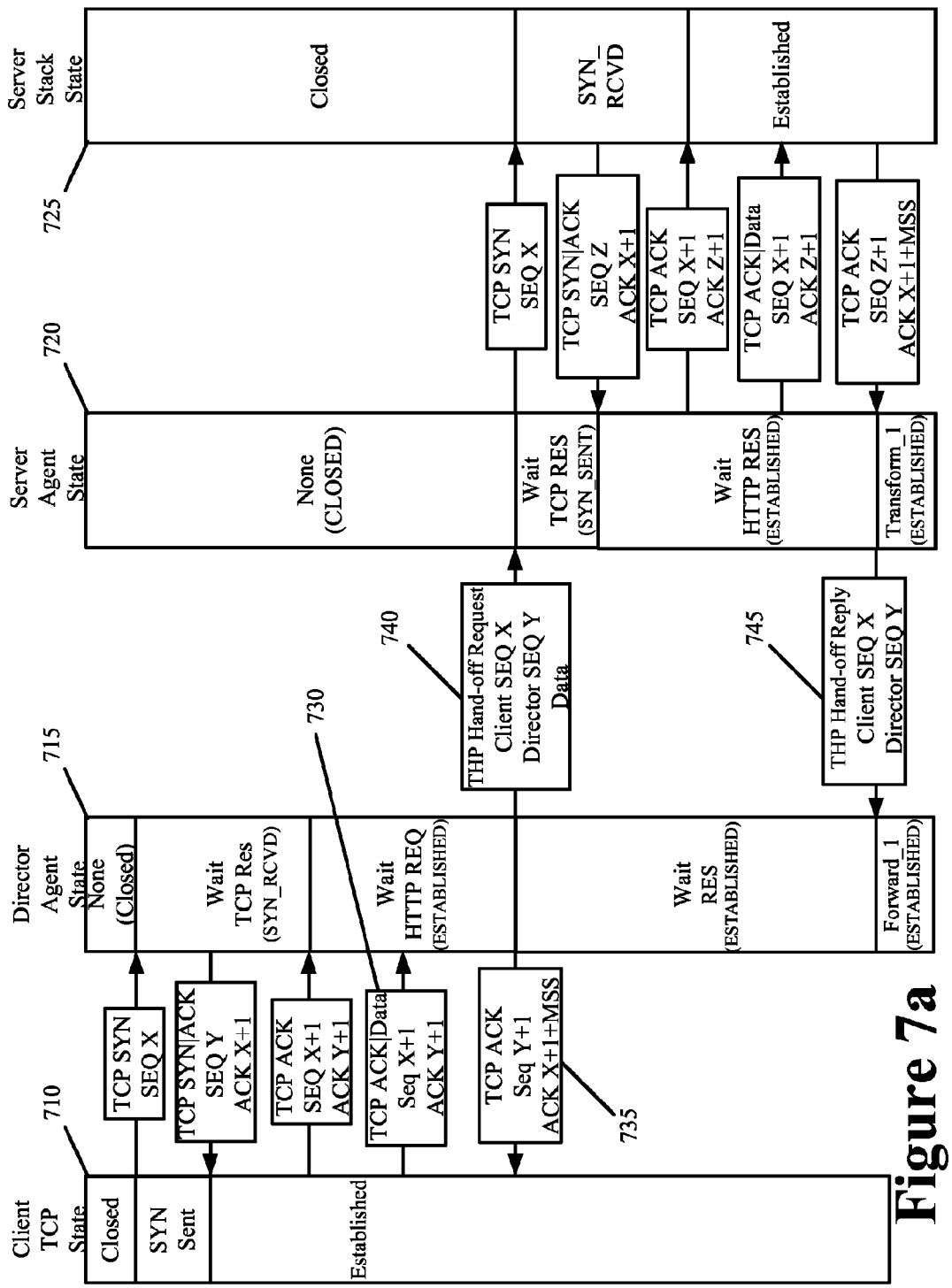
FIGS. 7a and 7b illustrates a message exchange between a client, director agent, server agent, and a native protocol stack of a server for performing network connection hand-off in accordance with some embodiments.
Figure 7B:
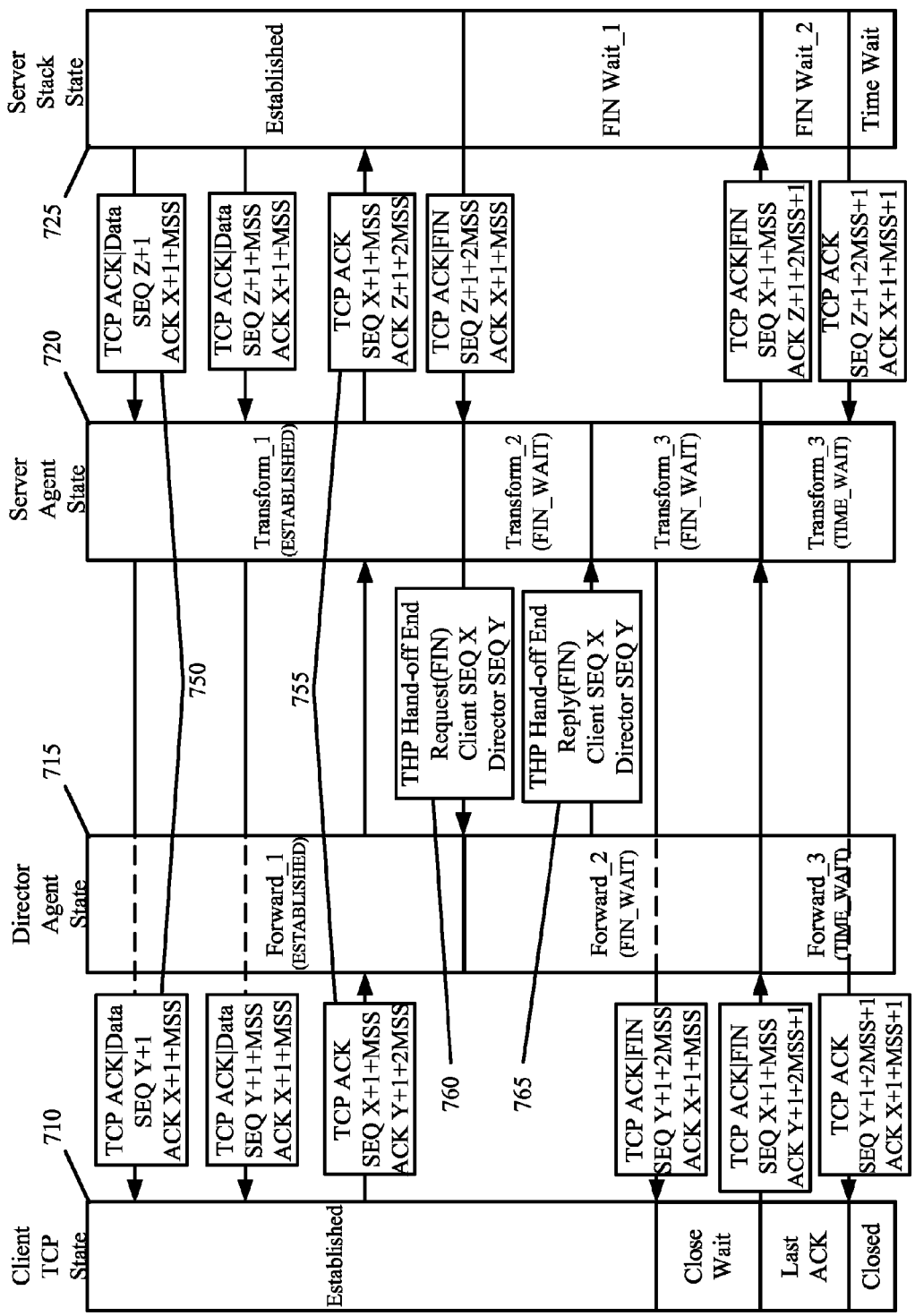

FIGS. 7a and 7b illustrate a message exchange between a client 710, director agent 715, server agent 720, and a native protocol stack of a server 725 for performing network connection hand-off in accordance with some embodiments. The figure illustrates the states of each of the client 710, director agent 715, server agent 720, and native protocol stack 725 within the center of the columns that represent each of the client 710, director agent 715, server agent 720, and native protocol stack 725. Additionally, the parentheticals in the columns of the director agent 715 and the server agent 720 represent TCP state transitions that occur during the hand-off of a TCP network connection.

The message exchange begins with a TCP handshaking procedure being performed between the client 710 and the director agent 715. The TCP handshaking procedure includes an initial TCP SYN packet with a first sequence number (i.e., SEQ X) sent from the client 710 to the director agent 715. Upon receiving the TCP SYN packet, the TCP state of the director agent 715 transitions to a SYN_RCVD (received) state as the director agent 715 responds with a TCP SYN|ACK packet that includes a second sequence number (i.e., SEQ Y) and an acknowledgement number that is the first sequence number incremented by one (i.e., SEQ X+1). To complete the TCP handshaking, the client 710 sends a TCP ACK packet that includes the first sequence number incremented by one and an acknowledgement number that is the second sequence number incremented by one. When the director agent 715 receives the TCP ACK packet, the TCP network connection is established as shown in the TCP state of the director agent 715.

The figure next shows a content request being sent from the client 710 to the director agent 715. The content request is represented by the TCP ACK|DATA packet sent at 730. The director agent 715 acknowledges receiving the content request at 735.

Upon receiving the content request, the director agent 715 passes the network connection hand-off request to the server agent 720 as represented by the THP request at 740. The THP request includes summary information about the network connection such as the initial client 710 sequence number and the initial director agent 715 sequence number. Other data included with the THP request includes the content request from the client 710.

Upon receiving the THP request, the server agent 720 establishes a network connection with the native protocol stack of the server 725 using the same TCP handshaking procedure described above. Though the server agent 720 may use the same initial sequence number as the client 710, the native protocol stack 725 will reply with its own initial sequence number which is represented in the figure as SEQ Z. Once the network connection is established, the server agent 720 passes the content request to the native protocol stack 725 using the appropriate sequence and acknowledgement numbers. The native protocol stack 725 acknowledges receipt of the content request and the server agent passes the THP reply to the director agent 715 at 745.

At this stage, the network connection has been handed-off from the director agent 715 to the server agent 720 and the director agent 715 begins operating in forwarding mode. The forwarding mode of the director agent 715 and the transformations performed by the server agent 720 are illustrated in FIG. 7b. Specifically, as shown at 750, the director agent 715 forwards packets associated with the handed-off network connection to the server agent 720. The server agent 720 now operates in transformation mode in order to translate between the handed-off network connection and the network connection between the server agent 720 and the native protocol stack 725. In transformation mode, the server agent 720 performs the necessary header field transformations for incoming and outgoing packets to allow for intercommunication between the client 710 and the native protocol stack 725. As shown, the sequence numbers in packets 750 and the acknowledgement numbers in packets 755 are transformed to facilitate the intercommunication between the client 710 and the native protocol stack 725.

FIG. 7b also illustrates a hand-off end request at 760 that is sent from the server agent 720 to the director agent 715. The server agent 720 passes the hand-off end request upon identifying that the server's native protocol stack has sent a FIN or RST packet. A FIN packet from the server indicates that the server has completed distributing the requested content to the client 710. A RST packet from the server may also indicate that the server has completed distributing the requested content or that an error has occurred to which the server responds by resetting the established network connection. These messages (i.e., FIN and RST) that originate from the server's native protocol stack 725 ordinarily do not pass through the director or director agent 715 when some form of direct routing, direct server return, or IP forwarding is used to avoid the director as a hop along the return path. By sending the hand-off end request to the director agent 715, the director agent 715 becomes aware of these various state transitions that occur at the server and the director agent 715 can respond accordingly.

This hand-off end exchange is used to deal with a client that reuses a particular client port in a subsequent TCP SYN packet that targets the same server IP address and server port. The hand-off end exchange is used to take the director agent 715 or director out of the forwarding mode such that subsequent TCP SYN packets sent by the client are intercepted by the director agent 715 in order to reperform the hand-off process.

In this figure, the hand-off end request at 760 is a hand-off end (FIN) request. The director agent 715 responds to this hand-off end request by sending a hand-off end (FIN) reply to the server agent 720 at 765. Then, the server agent 720 sends a transformed FIN to the client 710. Upon receiving the hand-off end (FIN) request, the director agent 715 transitions the TCP state of the connection to FIN_WAIT which involves changing the keep-alive interval of the connection from a large number of seconds (e.g., 900) to a small number of seconds (e.g., 10). If no more packets associated with the connection are received by the director agent 715 within the smaller keep-alive interval, the director agent 715 will delete the connection state. However, if a packet carrying a FIN or RST is received by the director agent 715 within the keep-alive interval, the director agent 715 will transition to a terminal TCP state such as closed or TIME_WAIT. If the director agent 715 is in FIN_WAIT TCP state, because it received a hand-off end request or received the client's FIN, and the director agent 715 subsequently receives a new TCP SYN from the client 710, then the director agent 715 can recycle the connection state and attempt to perform the hand-off process. If the new TCP SYN arrives while the director agent 715 is in the closed or TIME_WAIT state, then the director agent 715 will recycle the connection state and begin the hand-off process using the parameters from the new SYN. If a new TCP SYN arrives while the director agent 715 is in the established TCP state, the new TCP SYN will be forwarded to the server agent 720 where it is translated and then delivered to the server's native protocol stack 725. The server's native protocol stack 725 will handle responding to the duplicate TCP SYN.

In some embodiments where the director agent 715 receives a hand-off end (RST) request, the director agent 715 transitions the TCP state of the connection to CLOSED and sends a hand-off end (RST) reply to the server agent 720. The TCP state CLOSED and TIME_WAIT have a short keep-alive interval, but if a new TCP SYN arrives before the keep-alive interval expires then the connection state will be recycled and the hand-off process will proceed with the recycled connection state.

V. Server System

Many of the above-described processes and components are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Server, computer, and computing machine is meant in its broadest sense, and can include any electronic device with a processor including cellular telephones, smartphones, portable digital assistants, tablet devices, laptops, notebooks, and desktop computers. Examples of computer readable media include, but are not limited to, CD-ROMs, flash drives, RAM chips, hard drives, EPROMs, etc.

Figure 8:
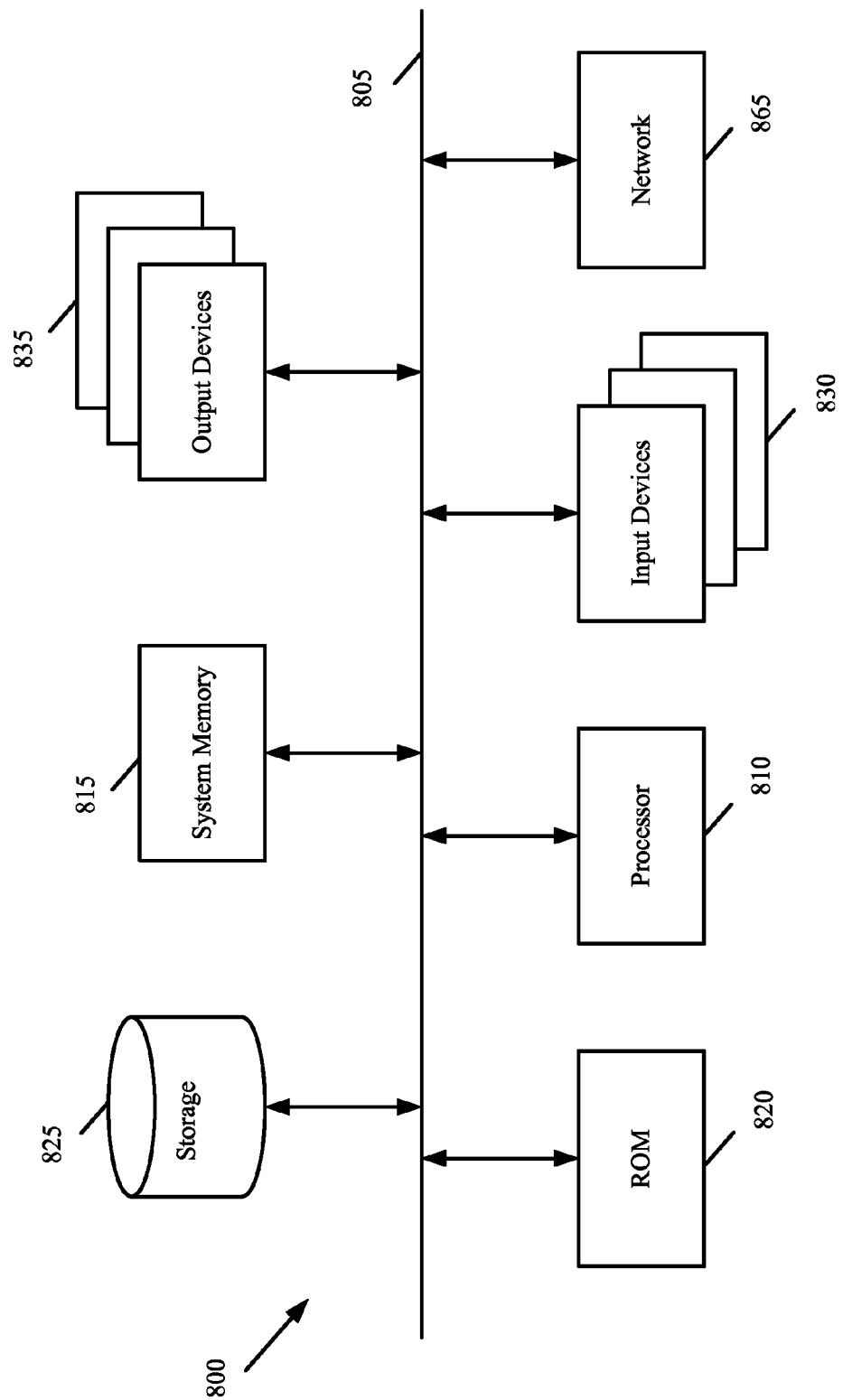
FIG. 8 illustrates a computer system or server with which some embodiments are implemented.

FIG. 8 illustrates a computer system or server with which some embodiments are implemented. Such a computer system includes various types of computer readable mediums and interfaces for various other types of computer readable mediums that implement the various methods and agents described above (e.g., director agent and server agent). Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 825.

Other embodiments use a removable storage device (such as a flash drive) as the permanent storage device Like the permanent storage device 825, the system memory 815 is a read-and-write memory device. However, unlike storage device 825, the system memory is a volatile read-and-write memory, such a random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices (also called "cursor control devices"). The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the internet. For example, the computer 800 may be communicably coupled through the network 865 to an ingest server, mid-tier server, edge server, content provider streaming server, or end user device.

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for handing-off a network connection in a server farm comprising at least one director, a set of servers, and a set of transformation agents that is associated with the set of servers, the method comprising:
    establishing a first network connection for facilitating intercommunication between said director and a client using a first set of state parameters;
    processing at said director, a content request that is received over the first network connection from the client, wherein processing the content request comprises using a routing procedure to select a particular server from the set of servers that is responsible for hosting content that is requested in the content request;
    passing, from the director to a transformation agent that is associated with the particular server, a connection hand-off request comprising the first set of state parameters and said content request, said passing of the connection hand-off request conducted using a connectionless oriented protocol;
    completing hand-off of the first network connection from the director to the transformation agent as a result of the passing of the connection hand-off request and a reply to the connection hand-off request; and
    performing transformations at the transformation agent using the first set of state parameters provided in the connection hand-off request, wherein performing the transformations comprises transforming (i) a second set of state parameters for packets encapsulating the requested content passing over a second network connection established between the transformation agent and a protocol stack of the particular server to (ii) said first set of state parameters for passage of said packets from the transformation agent to the client over the first network connection.

2. The method of claim 1, wherein performing the transformations further comprises transforming the first set of state parameters for packets originating from the client over the first network connection to the second set of state parameters for passing to the particular server over the second network connection.

3. The method of claim 1, wherein establishing the first network connection comprises establishing the first network connection using a first network protocol and passing the connection hand-off request comprises passing the connection hand-off request using a second network protocol that is different than the first network protocol.

4. The method of claim 3, wherein passing the connection hand-off request comprises passing a single packet using the connectionless oriented protocol without establishing a network connection between said director and either of the particular server and the transformation agent, said single packet encapsulating the first set of state parameters and the content request from the client.

5. The method of claim 3, wherein establishing the first network connection comprises establishing a Transmission Control Protocol (TCP) network connection, wherein the first set of state parameters comprises a first sequence number and a first acknowledgement number, and wherein the second set of state parameters comprises a second sequence number and a second acknowledgement number.

6. The method of claim 1 further comprising establishing the second network connection for facilitating intercommunication between said transformation agent and the protocol stack of the particular server using the second set of state parameters that are different than the first set of state parameters.

7. The method of claim 6 further comprising passing a reply from the transformation agent to the director to cause the director to forward packets associated with the first network connection to the transformation agent for subsequent passing to the particular server using the second network connection.

8. The method of claim 7 further comprising storing packets associated with the first network connection at the director before receiving the reply and forwarding the stored packets to the transformation agent upon receiving the reply.

9. The method of claim 1 further comprising serving the requested content using at least one of direct server return, direct routing, and Internet Protocol (IP) forwarding to avoid said director as a hop when passing said content to the client over the first network connection.

10. The method of claim 1, wherein said director comprises at least one of (i) a device that is separate from the set of servers, and (ii) a machine process that executes on a server of the set of servers.

11. A method for facilitating hand-off of a network connection in a server farm, the method comprising:
    establishing a network connection comprising a set of state parameters that facilitate communications over said network connection;
    identifying a content request that is received over said network connection;
    selecting a particular server from a set of servers based on the content request, wherein the particular server is responsible for hosting said requested content;
    passing a hand-off request to the particular server, wherein said hand-off request comprises the set of state parameters and said content request, said passing of the hand-off request conducted using a connectionless oriented protocol; and
    completing the hand-off upon receiving a reply in response to the hand-off request, wherein completing the hand-off comprises forwarding any packets that are received over the network connection to the particular server.

12. The method of claim 11 further comprising storing the set of state parameters upon establishing the network connection and storing the content request upon identifying the content request.

13. The method of claim 12 further comprising deleting the set of parameters and the content request upon receiving the reply.

14. The method of claim 1 further comprising establishing the second network connection between the transformation agent and the protocol stack of the particular server independent of the first network connection, wherein establishing the second network connection comprises determining the second set of state parameters for communicating over the second network connection, said determining occurring without replay of any of the first set of state parameters.

15. A method for handing-off a network connection in a server farm comprising at least one director, a set of servers, and a set of transformation agents that is associated with the set of servers, the method comprising:
    receiving a connection hand-off request comprising (i) a first set of network connection parameters for communicating over a first network connection that is established between the director and a client and (ii) a content request submitted by the client to the director, said connection hand-off request initiating hand-off of the first network connection from the director to a transformation agent that is associated with a particular server of the set of servers that is selected by the director to respond to the content request;

establishing a second network connection between the transformation agent and a protocol stack of the particular server independent of the first network connection, wherein establishing the second network connection comprises determining a second set of network connection parameters for communicating over the second network connection, said determining occurring without replay of any of the first set of network connection parameters;

completing hand-off of the first network connection from the director to the transformation agent by passing to the director, a reply to the connection hand-off request; and performing transformations at the transformation agent by converting from the first set of network connection parameters to the second set of network connection parameters for data packets that are passed over the first network connection for delivery to the particular server by way of the second network connection and by converting from the second set of network connection parameters to the first set of network connection parameters for data packets that are passed over the second network connection for delivery to the client by way of the first network connection.

16. The method of claim 15, wherein receiving the connection hand-off request and passing the reply to the connection hand-off request is performed using a stateless protocol.

17. The method of claim 15, wherein performing transformations at the transformation agent by converting from the first set of network connection parameters to the second set of network connection parameters comprises transforming a sequence number from a first sequence number space that is established for the first network connection to a second sequence number space that is established for the second network connection.

18. The method of claim 17, wherein performing transformations at the transformation agent by converting from the first set of network connection parameters to the second set of network connection parameters further comprises transforming a TCP window parameter from a first window scale factor that is established for the first network connection to a second window scale factor that is established for the second network connection.

19. The method of claim 17, wherein performing transformations at the transformation agent by converting from the first set of network connection parameters to the second set of network connection parameters further comprises transforming an acknowledgement number from a first acknowledgement number space that is established for the first network connection to a second acknowledgement number space that is established for the second network connection.

* * * * *